May 16, 1950 W. C. SMITH 2,507,684
MEASURING TAPE OR STRIP FOR BEVERAGE BOTTLES
Filed Dec. 15, 1948
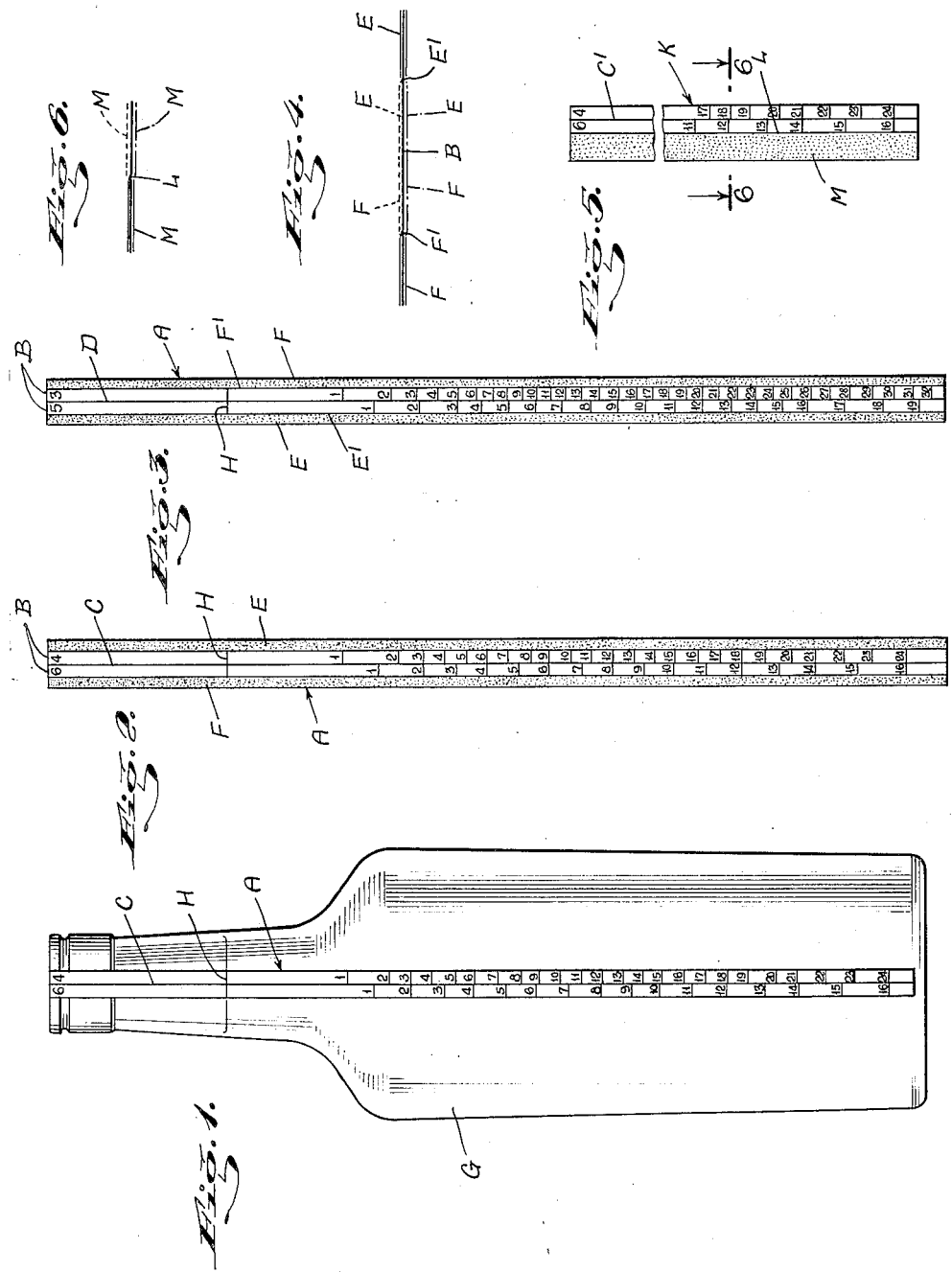
INVENTOR
WILLIAM C. SMITH
BY
Bartlett, Eyre, Keel & Weymouth
ATTORNEYS Patented May 16, 1950

2,507,684

UNITED STATES PATENT OFFICE 2,507,684

MEASURING TAPE OR STRIP FOR BEVERAGE BOTTLES

William C. Smith, New York, N. Y.

Application December 15, 1948, Serial No. 65,391

4 Claims. (Cl. 33—137)

This invention relates to measuring tape or strips for use on bottles and the like and particularly tape or strips for visually indicating the quantity of liquor removed from or remaining in a bottle, although certain features of the invention have other uses.

The conventional bottles for dispensing alcoholic and other beverages are not graduated or otherwise marked to indicate the quantity of beverage which has been removed or the quantity which still remains. It is impossible or impracticable to actually measure the quantities of beverage still remaining in the bottles in the many bottles in a saloon and the bartender or owner ordinarily resorts to the inaccurate and unsatisfactory method of guessing or estimating the remaining contents of the bottles from the height of the levels of the beverages therein. I have devised a novel tape or strip for ready attachment to a bottle which accurately gives at a mere glance the information desired by the user.

Another object of the invention is a measuring tape or strip of the above indicated character which is capable of ready use in saloons selling different sized drinks to indicate accurately and at a mere glance the number of drinks already dispensed from a bottle and the number still remaining in the bottle.

A further object of the invention is a measuring tape or strip of the above indicated character which is further characterized by its low cost, by the ease with which it may be affixed to a bottle and by its narrow width notwithstanding its capability of use in bars or saloons dispensing different sized drinks.

Further objects of the invention will hereinafter appear.

For a better understanding of the invention reference may be had to the accompanying drawings forming a part of this application wherein Fig. 1 shows a side elevation of the invention applied to a bottle;

Fig. 2 is a plan view of one side of a tape or strip embodying the invention;

Fig. 3 is a plan view of the other side thereof;

Fig. 4 is an enlarged end view of the tape or strip; and

Figs. 5 and 6 show a modification of the invention.

Referring to Figs. 2, 3 and 4 of the drawings I have shown my invention as embodied in the tape or strip A which is readily adapted for use in saloons dispensing four different sized drinks, namely, $3/4$ ounce, $4/4$ ounce, $5/4$ ounce and $6/4$ ounce drinks. It is made of any suitable inexpensive material such as paper and embodies a central narrow main body portion B having gradations or markings on both sides thereof. This central narrow main body portion B of the tape is divided into two or more elongated portions on either side thereof, these different portions accommodating gradations or markings for different sized drinks. In the particular embodiment shown the tape or strip on one side has the main body portion B divided by the line C into two elongated portions, one portion having markings thereon corresponding to the $4/4$ ounce drinks and the other portion having gradations or markings corresponding to $6/4$ ounce drinks, the numerals 4 and 6 at the top of the strip indicating one ounce and one and a half ounce drinks. Similarly in this embodiment the reverse side of the tape shown in Fig. 3 is divided into only two elongated portions by a single line D and the portions of the main body part B on the opposite sides of this line D are provided with markings or gradations corresponding to $3/4$ ounce drinks and $5/4$ ounce drinks respectively, the numerals 3 and 5 at the top indicating drinks of these sizes respectively.

The main body portion B of the tape has foldably attached thereto edges E and F, the fold lines being indicated at E' and F' respectively. Each of these edges E and F is provided with a suitable adhesive and as indicated may be folded over either way along the fold lines E' and F' to cover up or partially cover up the surface of the main body portion B on one side and to leave the whole surface of the body portion B exposed on the other side. In Fig. 4 I have indicated schematically by dot and by dot and dash lines how the edges E and F may be folded either way along the folding lines E' and F'. If the tape or strip is to be used in a bar or saloon wherein drinks of sizes either one ounce or one and a half ounce are sold then the edge E of the strip is folded along the line E' to cover up the five-quarter ounce gradations while the edge F is folded along the line F' to cover up the three-quarter ounce gradations, and the strip is then affixed by fastening the exposed adhesive sides of the edges E and F to the bottle, leaving the gradations showing the one ounce and one and a half ounce drinks exposed. If desired the edges E and F at the same time they are glued or sealed to the bottle may be glued or sealed to the main body portion B of the tape. If the tape is to be used in an establishment where either the three-quarter ounce or the five-quarter ounce drinks are sold, then the edges E and F are folded in the opposite direction to cover or partially cover the gradations corresponding to the one ounce and the one and a half ounce drinks and the tape or strip is affixed to the bottle similarly as described above.

In the particular embodiment illustrated I have shown the tape or strip A as calibrated with gradations or markings suitable for use with a conventional and popular whiskey bottle G and in Fig. 1 the tape or strip A is affixed to this bottle longitudinally thereof so as to expose the gradations 1, 2, 3, 4, etc. corresponding on one side of the dividing line C to one ounce, namely 4/4 ounce drinks and on the other side to the one and a half ounce drinks, namely 6/4 ounce. The line H on the strip indicates the level of the whiskey in the bottle when the bottle is full or as the whiskey is retailed in bottled form. The beverage contained in the bottle between the line H and the gradation 1 corresponds to the one ounce in one case and one and a half ounce in the other, and similarly with respect to the succeeding gradations.

The folding lines E' and F' may be formed in any suitable manner as, for example, by perforations or by weakening the strip longitudinally therealong on both sides or in any other suitable manner and it is understood that my invention contemplates any suitable method of forming the fold lines E' and F'.

In the embodiment of Figs. 5 and 6 the measuring tape or strip K is provided with a fold line L extending longitudinally therethrough and approximately midway of the width of the tape. As in the embodiment of Figs. 1 to 4, the strip is provided for use in establishments where beverage drinks of three-fourths, four-fourths, five-fourths and six-fourths ounce are used and Fig. 5 shows the side with the gradation columns for four-fourths ounce and six-fourths ounce while the back side contains the gradations columns for three-fourths ounce and five-fourths ounce directly beneath the columns shown in Fig. 5. C' indicates the dividing line between the columns shown in Fig. 5. The lefthand edge M of the tape or strip K looking at Fig. 5 which is of the approximate width of the sum of the columns four-fourths ounce and six-fourths ounce gradations has applied to both sides thereof an adhesive and by folding the edge M over in one direction the columns three-fourths ounce and five-fourths ounce are covered by the edge M and by folding in the opposite direction, the other columns, namely the columns four-fourths ounce and six-fourths ounce gradations are at least partially covered and the strip may thus be fastened to the bottle with either pair of columns exposed.

Fig. 6 shows schematically in section the edge M folded over along the line L in dotted lines in one direction and in dot and dash lines in the other direction.

A measuring tape or strip is thus obtained which is readily adaptable for use in establishments which dispense drinks of four different sizes, namely three-fourths, four-fourths, five-fourths and six-fourths ounce and if desired the main body portion B may be made slightly broader so as to make it possible to have gradations corresponding to six different sized drinks. In any case the tape or strip is characterized by its narrowness and it may be readily and quickly affixed to a bottle by the owner of the bar or establishment or by an employee. A continuous visual record of the quantity of liquor and number of drinks remaining in the bottle is thus maintained. It can be made very cheaply and sold at a low cost.

I claim:

1. A narrow elongated measuring and indicating strip for use on beverage bottles and the like having a central portion with columns of different dimensional gradations on each side thereof and having laterally foldable edges which are foldable in either direction to at least partially cover the columns of gradations on one side and to leave the columns of gradations on the other side wholly exposed and said laterally foldable edges having applied thereto on both sides an adhesive for attaching said strip to a beverage bottle with the gradation columns on one side exposed.

2. A narrow elongated measuring and indicating strip for use on beverage bottles and the like having a central portion with columns of different dimensional gradations on opposite sides thereof and laterally foldable edges provided with adhesive on both sides thereof.

3. A narrow elongated measuring and indicating strip for use on beverage bottles and the like having an edge portion with columns of different dimensional gradations on each side thereof and having an opposite edge portion which is laterally foldable in either direction to at least partially cover the columns of gradations on one side and to leave the columns of gradations on the other side exposed and said laterally foldable edge having applied thereto on both sides an adhesive for attaching said strip to a beverage bottle with the gradation columns on one side exposed.

4. A narrow elongated measuring and indicating strip for use on beverage bottles and the like having columns of different dimensional gradations on opposite reverse sides thereof and a laterally foldable edge adjacent said columns and provided with adhesive on both sides thereof whereby the measuring and indicating strip may be attached to a bottle with either of the columns of different dimensional gradations exposed by laterally folding the laterally foldable edge underneath and attaching to the bottle.

WILLIAM C. SMITH.

REFERENCES CITED

The following references are of record in the file of this patent:

UNITED STATES PATENTS

| Number | Name | Date |
| --- | --- | --- |
| 82,028 | Percival | Sept. 8, 1868 |
| 2,187,087 | Leary | Jan. 16, 1940 |